United States Patent [19]

Meier et al.

[11] Patent Number: 5,197,166
[45] Date of Patent: Mar. 30, 1993

[54] CORD CLOSURE

[75] Inventors: Terrence P. Meier, Naperville; Kurt H. Lundstedt, Long Grove, both of Ill.

[73] Assignee: Illinois Tool Works Inc., Glenview, Ill.

[21] Appl. No.: 880,096

[22] Filed: May 6, 1992

[51] Int. Cl.5 .............................................. F16G 11/00
[52] U.S. Cl. ................................ 24/115 G; 24/136 R
[58] Field of Search ............ 24/115 G, 115 R, 136 R, 24/136 WL, 136 L, 543, 129 A, 712.5, 712.9; 403/146, 11, 305, 301, 300

[56] References Cited

U.S. PATENT DOCUMENTS

| 2,379,676 | 7/1945 | Blackstone | 24/115 G |
|---|---|---|---|
| 2,471,623 | 5/1949 | Hubbell | 24/115 G |
| 2,733,886 | 2/1956 | Haberstump | 403/146 |
| 4,188,686 | 2/1980 | Baum . | |
| 4,328,605 | 5/1982 | Hutchison et al. . | |
| 4,453,292 | 6/1984 | Bakker | 24/115 G |
| 4,506,417 | 3/1985 | Hara | 24/115 G |
| 4,622,723 | 11/1986 | Krauss | 24/136 R |
| 4,675,948 | 6/1987 | Bengtsson . | |
| 4,724,584 | 2/1988 | Kasai | 24/136 R |
| 4,794,673 | 1/1989 | Yamaguchi | 24/115 G |
| 4,839,946 | 6/1989 | Murai | 24/115 G |
| 5,015,023 | 5/1991 | Hall . | |

Primary Examiner—Victor N. Sakran
Attorney, Agent, or Firm—Schwartz & Weinrieb

[57] ABSTRACT

A cord closure for securely retaining flexible cord, drawstrings, and the like in a selected position includes a plunger member, a compression spring, a retaining ring, and a body housing. There is provided means for initially holding the plunger sub-assembly in a pre-assembled position with the spring being compressed so that the holes of the plunger member and body housing can be readily aligned for insertion of a cord. Once the cord is threaded through the aligned holes, the plunger member is depressed downwardly and released to allow the spring to expand and urge the plunger member to move up axially, thereby locking the cord between the plunger member and the body housing.

20 Claims, 2 Drawing Sheets

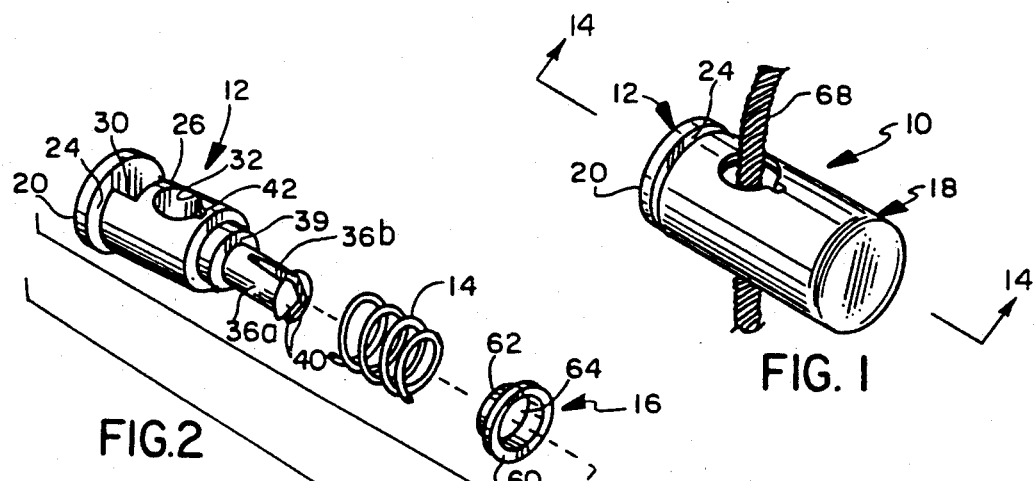
FIG. 1
FIG. 2
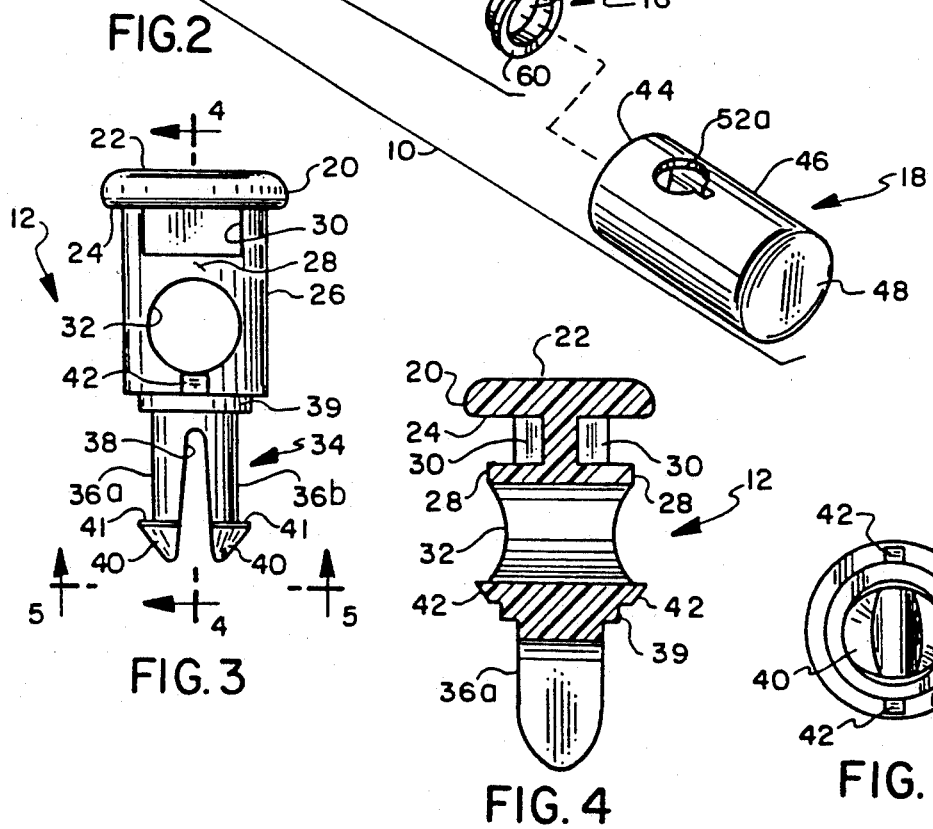
FIG. 3
FIG. 4
FIG. 5
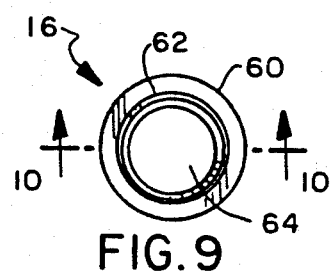
FIG. 9
FIG. 10

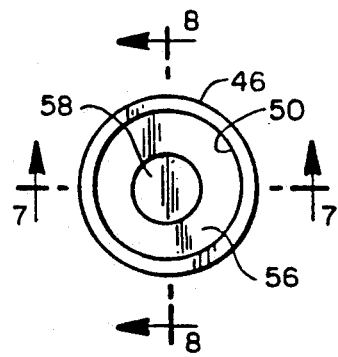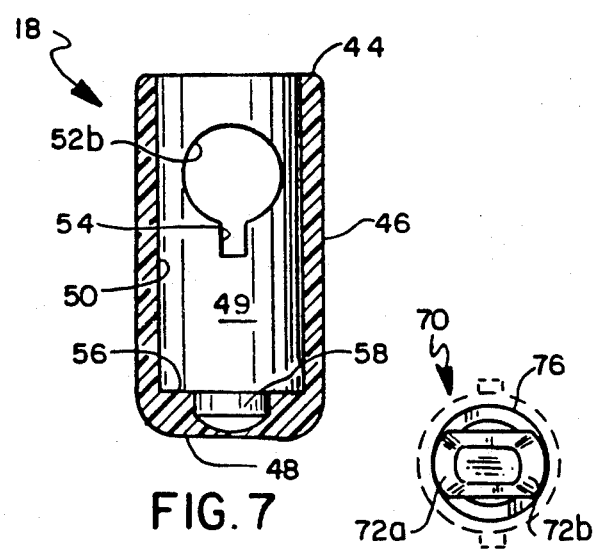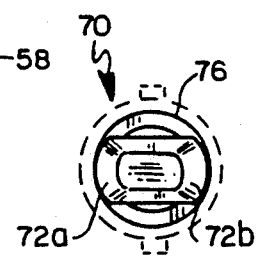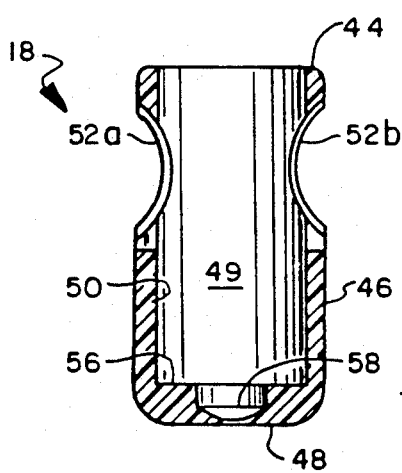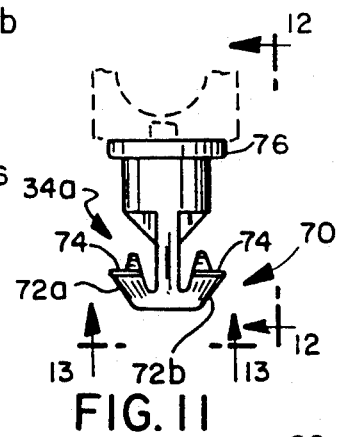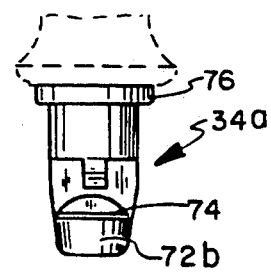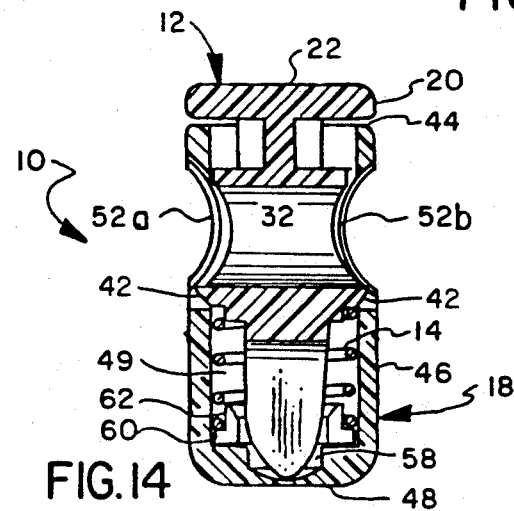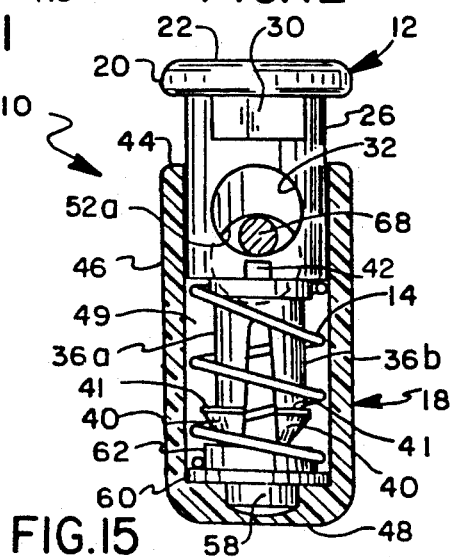

CORD CLOSURE

BACKGROUND OF THE INVENTION

1. Field of the Invention

This invention relates generally to cord clamping or locking devices and more particularly, it relates to an improved cord closure formed of a plunger, a compression spring, a retaining ring, and a body housing which includes means for initially holding the plunger subassembly in a "pre-assembled" position with the spring being compressed so that the throughhole of the plunger and the holes of the body housing can be readily aligned for insertion of a cord.

2. Description of the Prior Art

Heretofore, there are known in the art various types of cord or string fasteners, which are attached to cords or drawstrings on helmets, hats, sleeping bags, hooded parkas, backpacks, garments, or any other application wherein drawstrings are employed, for releasably fastening or stopping the drawstrings. Generally, cord locks that have been developed for this purpose include telescoping cylinders having co-operating lateral apertures urged apart by a compression spring. Initially, the cylinders must be manually urged toward one another against the force of the biasing spring to align the apertures on the cylinders prior to insertion of the cord. When the force on the cylinders is released, the spring causes opposing edges of the apertures in the cylinders to clamp the cord.

Such prior art cord fasteners have the disadvantage in that a very tedious and time-consuming adjustment is necessary so as to manually align the apertures in the respective cylinders before the cord could be assembled onto the cord fastener, thereby increasing labor costs. It would therefore be desirable to provide an improved cord closure which eliminates this need of initially aligning manually the apertures in the respective cylinders. The improved cord closure also helps to avoid carpal tunnel syndrome because there is no repetitive squeezing to align the apertures when inserting a cord during assembly.

A state of the art search directed to the subject matter of this application uncovered the following U.S. Letters Patent:

| | |
|---|---|
| 2,379,676 | 4,675,948 |
| 4,188,686 | 4,724,584 |
| 4,328,605 | 4,839,946 |
| 4,453,292 | 5,015,023 |
| 4,622,723 | |

There is disclosed in U.S. Pat. No. 4,328,605 to V. James Hutchison et al., issued on May 11, 1982, a cord clamp which includes a main body or sleeve 14, a piston or plunger 16, a cap 18 and a compression spring 20. The plunger 16 and the sleeve 14 are mounted together in close fitting telescopic engagement so that they are axially moveable with respect to one another. The compression spring 20 is then positioned in the sleeve 14, and the cap 18 is then placed in sealing relationship to the sleeve 14 so as to retain the spring 20 between the cap 18 and the plunger 16. The spring normally biases the sleeve and the plunger in a first position wherein the bores 56 in the plunger are not in register with the holes 38 in the sleeve. As the plunger is moved toward the interior of the sleeve against the force of the spring 20 to a second position, the holes 38 and the bore 56 become registered in alignment.

In U.S. Pat. No. 4,453,292 to John A. Bakker issued on Jun. 12, 1984, there is taught a cord lock which includes a cylinder 12, a plunger 14 and a helical compression biasing spring 16 trapped therebetween. A pair of teeth 58 formed on the plunger rides in lead-in ramps 30 disposed inwardly of the cylinder's open end when the piston is assembled into the cylinder by being moved axially towards the closed end of the cylinder. As a result, the teeth cam over the ramps and the shoulder 62 of the teeth will snap into respective pair of aligned lateral apertures 34 to retain the piston in assembled relation to the cylinder.

There is disclosed in U.S. Pat. No. 4,622,723 to Mark J. Krauss issued on Nov. 18, 1986, a cord lock which includes a housing 11 having a bottom wall 17 so as to form a recess 18 and opposed side walls 13, 14 with holes 21, 22 and an insert 12 slidably received in the recess. The insert includes a plunger portion 30 and an integral W-shaped spring portion 31 disposed on the end thereof. The plunger portion is formed with a throughhole 35. When the plunger is depressed and the spring is compressed, the plunger throughhole 35 aligns with the holes 21 and 22 on the housing sides so as to receive a cord.

In U.S. Pat. No. 4,675,948 to Sigurd W. Bengtsson issued on Jun. 30, 1987, there is taught a cord locking device which includes a sleeve 13 and a latching slide 14 insertable therein. The latching slide comprises a body 17 terminating outwardly in a head 18, and a spring 19 formed of a zig-zag material is made integral with the body 17. The sleeve 13 includes openings 12a and 12b formed on the long sides thereof, and an opening 12c is formed in the body 17 which is placeable in register with the openings in the sleeve.

The remaining patents listed above but not specifically discussed are believed to be of only general interest and show the state of the art in cord clamping devices for securely retaining a flexible cord or drawstring in a fixed position with respect to the clamping device.

However, none of the prior art uncovered in the search disclosed a cord closure like that of the present invention which includes means for initially holding the plunger sub-assembly in a pre-assembled position with a spring being compressed so that the throughhole of the plunger and the holes of a body housing can be readily aligned for insertion of a cord. This is accomplished by a retaining ring having a bottom surface and by providing prongs with lateral shoulders formed on a stem portion of the plunger which are lockingly engagable with the bottom surface of the retaining ring. As a result, the sub-assembly of the plunger, spring and retaining ring is then inserted telescopingly into the cavity of the body housing so as to coaxially align the throughhole of the plunger with the holes of the body housing for receiving the cord.

OBJECTS OF THE INVENTION

Accordingly, it is a general object of the present invention to provide an improved cord closure which is relatively simple and economical to use and manufacture, but yet overcomes the disadvantages of the prior art clamping devices.

It is an object of the present invention to provide an improved cord closure which includes means for initially holding the plunger sub-assembly in a pre-assembled position with the spring being compressed so that the throughhole of the plunger and the holes of the body housing can be readily aligned for insertion of the cord.

It is another object of the present invention to provide an improved cord closure formed of a plunger, a compression spring, a retaining ring, and a body housing, the plunger having prongs for releasably locking the compression spring in a compressed state between the body portion of the plunger and the retaining ring to define a pre-assembled position

SUMMARY OF THE INVENTION

In accordance with these aims and objectives, the present invention is concerned with the provision of an improved cord closure for securely retaining a flexible cord, drawstring, and the like in a fixed position. The cord closure includes a body housing, a plunger member, a compression spring, and a retaining ring. The body housing has an open end, a surrounding outer side wall, and a closed end to form a cavity therein. The body housing further includes a pair of holes formed on the outer side wall at diametrically opposed positions for receiving a cord. The plunger member has a head, a body portion, and a stem portion. The body portion joins the head to the stem portion and includes a transverse throughhole extending diametrically therethrough. The compression spring is positioned over the stem portion and has a first end thereof engaging the body portion and a second end. The retaining ring includes an upstanding portion positioned into the second end of the compression spring.

The stem portion includes means for releasably locking the compression spring in a compressed state between the body portion of the plunger and the retaining ring to define a pre-assembled position for a sub-assembly of the plunger, spring, and retaining ring. The sub-assembly is inserted telescopingly into the cavity of the body housing so as to coaxially align the throughhole of the plunger with the pair of holes of the body housing for receiving the cord. When the head of the plunger is depressed and released, the locking means becomes disengaged so as to allow the spring to expand and urge the plunger to move up axially to lock the cord between the plunger and the body housing.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 1 is a perspective view of a cord closure constructed in accordance with the principles of the present invention, illustrating the cord closure in the fully assembled condition;

FIG. 2 is an exploded perspective view of the cord closure of FIG. 1;

FIG. 3 is a front plan view of the plunger of the cord closure of FIG. 1;

FIG. 4 is a cross-sectional view, taken along the lines 4—4 of FIG. 3;

FIG. 5 is a bottom end view, taken along the lines 5—5 of FIG. 3;

FIG. 6 is a top plan view of the body housing of the cord closure of FIG. 1;

FIG. 7 is a cross-sectional view, taken along the lines 7—7 of FIG. 6;

FIG. 8 is a cross-sectional view, taken along the lines 8—8 of 6;

FIG. 9 is a top plan view of the retaining ring of the cord closure of FIG. 1;

FIG. 10 is a cross-sectional view, taken along the lines 10—10 of FIG. 9;

FIG. 11 is a second embodiment of the stem portion for use with the plunger of the present invention;

FIG. 12 is a side elevational view, taken along the lines 12—12 of FIG. 11;

FIG. 13 is a bottom view, taken along the lines 13—13 of FIG. 11;

FIG. 14 is a longitudinal sectional view, taken along the lines 14—14 of FIG. 1, illustrating the plunger in the pre-assembled position to compress the spring; and FIG. 15 is a view similar to FIG. 14, except turned 90° from the position shown in FIG. 14 and showing an expanded position of the spring for clamping the cord during use.

DESCRIPTION OF THE PREFERRED EMBODIMENTS

Referring now in detail to the various views of the drawings, and in particular to FIGS. 1 and 2, there is shown an improved cord closure designated generally by reference numeral 10 and constructed in accordance with the principles of the present invention. The novel cord closure 10 of the present invention is adapted for releasably fastening one or more flexible cords, drawstrings, ropes and the like in a selected position with respect to the closure. The closure is comprised of a plunger member 12, a helical compression biasing spring 14, a retaining ring 16, and a body housing 18.

The plunger 12, retaining ring 16, and body housing 18 each may be formed of a number of materials having a relatively high strength and a high dimensional stability. The cord closure has particular applications in devices employing drawstrings such as on helmets, hats, sleeping bags, hooded parkas, backpacks, garments and the like since the cord closure according to the present invention eliminates the need of manually aligning the apertures on the plunger 12 and the body housing 18 prior to insertion of drawstrings, thereby facilitating avoids the possibility that the installer will develop carpal tunnel syndrome.

Referring now to FIGS. 3-5, it can be seen that the plunger member 12 includes a cylindrical head 20 having a flat top surface 22 and a flat bottom surface 24. A body portion 26 extends axially from the bottom surface 24 and is of a generally cylindrical construction with arcuate surfaces 28 disposed on diametrically opposite sides thereof. A pair of recesses 30 are formed in the upper part of the body portion 26 immediately underlying the head 20 so as to eliminate a large mass of material in an area which might cause problems during manufacturing. In the general intermediate area of the arcuate surfaces made of the body portion, there is provided a transverse throughhole 32 extending diametrically therethrough and has an axis perpendicular to the longitudinal axis of the plunger. The throughhole 32 is adapted to be initially aligned with apertures or holes in the body housing in a "pre-assembled" position, as will be more fully explained hereinafter.

A stem portion 34 is formed integrally with, and extends from the lower part of the body portion 26 terminating in a pair of resilient legs 36a, 36b separated by an inverted U-shaped slot 38. The legs are joined to the lower part of the body portion 26 by a cylindrical neck 39 of a reduced diameter. Each of the resilient legs has a releasable locking prong 40 having lateral shoulders 41 disposed on its distal end for locking engagement with the retaining ring 16, as will be presently described. A pair of opposed small projections or ribs 42 are formed diametrically on the exterior surface of the lower part of the body portion 26 adjacent the lower mid-section of the throughhole 32 for movably receivable in co-mating slots in the body housing. The ribs serve to retain the plunger in the housing.

As can be seen from FIGS. 6-8, the body housing 18 is formed of a generally cylindrical shape and is hollow so as to telescopingly receive the plunger member 12 in a close fitting engagement. It should be appreciated, however, to those skilled in the art that other geometrical configurations may be employed without departing from the scope of the present invention. To this end, the body housing includes an opened end 44, a surrounding outer side wall 46, and a closed end 48. A cavity 49 is defined by the interior wall surface 50 of the side wall 46 extending between the opened end 44 and the closed end 48. A pair of opposed holes or bores 52a, 52b are formed in the intermediate area of the side wall 46 at diametrically opposed positions with respect to one another. A pair of opposed slots 54 are formed diametrically in the side wall adjacent to the lower mid-section of the opposed holes 52a, 52b for receiving the projection or ribs 42 of the plunger member 12.

As a practical matter, the inner diameter of the interior wall surface 50 is slightly larger than diameter of the body portion 26 of the plunger member 12. The closed end 48 of the body housing 18 is defined by an endwall 56 which is provided internally with a small central recess 58. The purpose of this recess will be understood shortly hereinafter. It will be noted from FIGS. 9 and 10 that the retaining ring 16 has an annular flange 60 whose outer diameter is somewhat larger than the recess 58 and has an upstanding circular wall portion 62 formed integrally with the flange 60 and spaced inwardly therefrom. The outer diameter of the upstanding portion 62 is slightly smaller than the inner diameter of the compression spring.

In order to assemble the plunger member 12, compression spring 14, and retaining ring 16 into a "pre-assembled" position shown in FIG. 14, the compression spring 14 is placed over the stem portion 34 of the plunger 12 and comes to rest on the bottom surface of the plunger body portion 26 so as to surround the neck portion 39. The diameter of the neck portion is slightly smaller than the inner diameter of the spring so that it may be frictionally mounted into one end of the spring. The upstanding wall portion 62 of the retaining ring 16 is inserted into the other end of the spring and is forced into engagement with the resilient legs 36a, 36b of the stem portion 34 when the spring 14 is sufficiently compressed.

As the prongs 40 are forced into the internal bore 64 of the retaining ring 16, the resilient legs 36a and 36b are caused to collapse or flex inwardly to allow the prongs to pass through the internal bore 64 and snap outwardly so that the lateral shoulders 41 will lockingly engage the bottom surface 66 of the flange 60 of the retaining ring 16. The shoulders 41 serve to hold or lock the spring 14 in a compressed state between the bottom surface of the plunger body portion 26 and the bottom surface 66 of the retaining ring. As a result, the sub-assembly of the plunger, spring and retaining ring into the pre-assembled position has been finished.

Next, to complete the assembly of the sub-assembly and the body housing 18 into the cord closure 10, the sub-assembly is inserted telescopingly into the cavity 49 of the body housing 18 while the projections 42 on the body portion 26 of the plunger force outwardly the open end 44 and snap past upper edges of the holes 52a, 52b and into the co-mating slots 54. The projections 42 on the plunger body portion 26 are retained by the upper edges of the holes 52a, 52b so as to prevent the sub-assembly from coming apart from the body housing 18. In absence of a tight interference fit, the sub-assembly will actually be "floating" or movable within the body housing 18. As axial pressure is subsequently applied to the head 20 of the plunger, the bottom surface 66 of the retaining ring 16 will come to rest on the interior surface of the endwall 56 of the body housing 18 adjacent the central recess 58 so as to coaxially align the throughhole 32 of the plunger with the holes 52a and 52b of the body housing. Consequently, a cord or drawstring 68 shown in FIG. 1 can now be simply inserted and threaded through the hole 52a, the throughhole 32, and the hole 52b without requiring the user to initially depress and hold the parts in alignment while threading the cord.

In operation, cord closure 10 is gripped edgewise by the user's fingers between the head 20 and the closed end 48, and then the head 20 is further depressed downwardly from its resting position so as to cause the prongs 40 to flex still inwardly due to the small recess 58. It will be noted that this downward movement of the plunger is permitted by the projections 42 on the plunger body portion 26 riding in the co-mating slots 54 formed in the side wall 46 on the body housing 18. As a result, the prongs will become disengaged from the bottom surface 66 of the retaining ring 16. As the head 20 of the plunger is released, the retaining ring 16 will snap over prongs 40 so as to allow the spring 14 to urge the plunger 12 to move up axially. The drawstring 68 is therefore gripped firmly by and between the plunger member 12 and the body housing 18 against accidental displacement, as shown in FIG. 15.

FIGS. 11-13 illustrate a second embodiment of the stem portion 34a for use in the plunger of the present invention. A stem 34a is substantially the same as the stem portion 34 shown in FIG. 3, except that it terminates in a W-shaped lower end portion 70 so as to form locking prongs 72a, 72b having lateral shoulders 74. With the shoulders 74 and a neck 76 thus provided, the bottom surface 66 of the retaining ring 16 can be releasably locked with the prongs 72a, 72b (identical to the prongs already shown in FIG. 3) to compress the spring 14 between the neck 76 and the bottom surface of the retaining ring to again produce the pre-assembled sub-assembly. The operation of the stem portion 34a is identical to the stem portion 34 of FIG. 3 and thus will not be repeated.

From the foregoing detailed description, it can thus be seen that the present invention provides an improved cord closure for securely retaining a flexible cord or drawstring in a fixed position. The cord closure of the present invention includes a plunger member, a compression spring, a retaining ring, and a body housing. There is provided means formed on a stem portion of the plunger member for initially holding the plunger sub-assembly in a pre-assembled position with the spring being compressed so that the holes of the plunger member and the body housing can be readily aligned for insertion of a cord. In use, once the drawstring has been threaded through the aligned holes the plunger is depressed downwardly from its resting position and released so as to allow the spring to expand and urge the plunger to move up axially to a reverse cord-lock position.

While there has been illustrated and described what is at present considered to be preferred embodiments of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiments disclosed as the best mode contemplated for carrying out the invention, but that the invention will include all embodiments falling within the scope of the appended claims.

What is claimed is:

1. A cord closure comprising:
   a body housing having an open end, a surrounding outer side wall, and a closed end to form a cavity therein, said housing having a pair of holes formed on the outer side wall at diametrically opposed positions for receiving a cord;
   a plunger member having a head, a body portion, and a stem portion, said body portion joining said head to said stem portion and having a transverse throughhole extending diametrically therethrough;
   a compression spring being positioned over the stem portion and having a first end thereof engaging the body portion and a second end;
   a retaining ring having an upstanding portion positioned into the second end of said compression spring;
   means formed on said stem portion for releasably locking said compression spring in a compressed state between said body portion of said plunger member and said retaining ring to define a pre-assembled position for a sub-assembly of said plunger member, spring, and retaining ring; and
   said sub-assembly being inserted telescopingly into said cavity of said body housing so as to coaxially align the throughhole of said plunger member with said pair of holes of said body housing for receiving the cord,
   whereby when said head of said plunger member is depressed downwardly and released said locking means becomes disengaged so as to allow said spring to expand and urge said plunger member to move up axially to lock the cord between said plunger member and said body housing.

2. A cord closure as claimed in claim 1, wherein said plunger member has a pair of ribs formed on its body portion which are retained by the upper edges of said pair of holes so as to prevent disengagement of the sub-assembly from said body housing.

3. A cord closure as claimed in claim 2, wherein:
   said body housing has co-mating slots formed within said outer side wall for receiving said ribs of said plunger member when said plunger member is depressed downwardly within said cavity of said body housing.

4. A cord closure as claimed in claim 1, wherein said locking means includes a pair of resilient legs having locking prongs with lateral shoulders lockingly engageable with a bottom surface of said retaining ring.

5. A cord closure as claimed in claim 4, further comprising:
   a central recess formed upon the interior of said closed end of said body housing so as to permit said prongs to flex inwardly for disengagement from said retaining ring when said plunger member is depressed downwardly within said cavity of said body housing.

6. A cord closure as claimed in claim 1, wherein said locking means includes a W-shaped portion having locking prongs with lateral shoulders lockingly engageable with a bottom surface of said retaining ring.

7. A cord closure as claimed in claim 6, further comprising:
   a central recess formed upon the interior of said closed end of said body housing so as to permit said prongs to flex inwardly for disengagement from said retaining ring when said plunger member is depressed downwardly within said cavity of said body housing.

8. A cord closure as claimed in claim 1, further comprising projections formed on said body portion of said plunger and slots formed on said body housing for receiving said projections, said projections being retained by the upper edges of said pair of holes so as to prevent the sub-assembly from coming apart from said body housing.

9. A cord closure as claimed in claim 1, wherein said body housing and said plunger member are formed of a high strength material.

10. A cord closure, comprising:
    a body housing having an open end, a surrounding outer wall, and a closed end so as to form a cavity therein, said housing having a pair of holes formed through the outer side wall at diametrically opposed positions for receiving a cord;
    a plunger member having a transverse throughhole extending diametrically therethrough;
    means for resiliently urging said plunger member towards said open end of said housing so as to move said throughhole out of alignment with respect to said pair of holes in said housing;
    means for initially releasably locking said plunger member at a first position relative to said housing so as to restrain said resilient means in a compressed state between said plunger member and said closed end of said body housing so that said throughhole of said plunger member and said pair of holes of said body housing can be readily aligned for insertion of said cord therethrough; and
    means for releasing said releasable locking means when said plunger member is depressed inwardly of said housing so as to permit said resilient means to urge said plunger member towards said open end of said body housing.

11. A cord closure as claimed in claim 10, wherein said body housing has a generally cylindrical configuration.

12. A cord closure as claimed in claim 11, wherein said plunger member has a generally cylindrical configuration.

13. A cord closure as claimed in claim 10, wherein:
    said releasable locking means includes a retaining ring and a pair of resilient legs having locking prongs with lateral shoulders lockingly engageable with a bottom surface of said retaining ring.

14. A cord closure as claimed in claim 13, further comprising:
  a central recess formed upon the interior of said closed end of said body housing so as to permit said prongs to flex inwardly for disengagement from said retaining ring when said plunger member is depressed inwardly with respect to said housing.

15. A cord closure as claimed in claim 10, wherein:
  said releasable locking means includes a retaining ring and a W-shaped portion having locking prongs with lateral shoulders lockingly engageable with a bottom surface of said retaining ring.

16. A cord closure as claimed in claim 15, further comprising:
  a central recess formed upon the interior of said closed end of said body housing so as to permit said prongs to flex inwardly for disengagement from said retaining ring when said plunger member is depressed inwardly with respect to said housing.

17. A cord closure as claimed in claim 10, further comprising projections formed on said body portion of said plunger and slots formed on said body housing for receiving said projections, said projections being retained by the upper edges of said pair of holes so as to prevent the sub-assembly from coming apart from said body housing.

18. A cord closure as claimed in claim 10, wherein said body housing and said plunger member are formed of a high strength material.

19. A cord closure, comprising:
  body housing means having a surrounding outer side wall extending between a first end and a second end so as to form a cavity therebetween, said housing means having a pair of holes formed upon the outer side wall at diametrically opposed positions for receiving a cord;
  plunger means having a transverse throughhole extending diametrically therethrough;
  resilient means for urging said plunger means towards said first end of said housing means so as to move said throughhole out of alignment with respect to said pair of holes in said housing means; and
  means for initially releasably locking said plunger means at a first position with respect to said second end of said body housing so as to compress said resilient means between said plunger means and said second end of said body housing means so that said throughhole or said plunger means and said pair of holes of said body housing means can be readily aligned for insertion of said cord therethrough;
  whereby, when said plunger means is depressed downwardly and released, said releasable locking means becomes disengaged so as to allow said resilient means to expand and urge said plunger means to move toward said first end of said body housing means so as to lock said cord between said plunger means and said body housing means.

20. A cord closure, comprising:
  a body housing having a pair of apertures formed within diametrically opposed portions thereof;
  a plunger member having a diametrically extending throughbore;
  a retaining ring disposed within said body housing;
  means defined between said retaining ring and said plunger member for releasably locking said plunger member at a first position within said body housing so as to align said diametrically extending throughbore of said plunger member with said pair of apertures of said body housing so as to permit a cord to be inserted through said pair of apertures of said body housing and said throughbore of said plunger member when said plunger member is disposed at said first position;
  spring means interposed between said plunger member and said retaining ring for biasing said plunger member to a second position at which said pair of apertures of said body housing and said throughbore of said plunger member are out of alignment with respect to each other so as to lockingly grasp said cord therebetween; and
  means defined between said plunger member and said body housing for releasing said releasable locking means of said plunger member from said retaining ring when said plunger member is moved inwardly with respect to said body housing so as to permit said spring means to bias said plunger member from said first position to said second position so as to lockingly grasp said cord between said throughbore of said plunger member and said pair of apertures of said body housing.

* * * * *